(12) United States Patent
Panje (10) Patent No.: US 12,356,217 B2
(45) Date of Patent: Jul. 8, 2025

(54) WI-FI MULTIPLE ACCESS POINT—THIRD PARTY EXTENDER CONFIGURATION

(71) Applicant: ARRIS Enterprises LLC, Suwanee, GA (US)

(72) Inventor: Krishna Prasad Panje, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 560 days.

(21) Appl. No.: 17/410,055

(22) Filed: Aug. 24, 2021

(65) Prior Publication Data

US 2022/0078635 A1 Mar. 10, 2022

Related U.S. Application Data

(60) Provisional application No. 63/076,039, filed on Sep. 9, 2020.

(51) Int. Cl.
| | |
|---|---|
| *H04W 24/02* | (2009.01) |
| *G06F 16/955* | (2019.01) |
| *G06F 40/174* | (2020.01) |
| *H04W 4/50* | (2018.01) |
| *H04W 48/16* | (2009.01) |

(52) U.S. Cl.
CPC .......... *H04W 24/02* (2013.01); *G06F 16/955* (2019.01); *G06F 40/174* (2020.01); *H04W 4/50* (2018.02); *H04W 48/16* (2013.01)

(58) Field of Classification Search
CPC ....... H04W 24/02; H04W 4/50; H04W 48/16; G06F 16/955; G06F 40/174
See application file for complete search history.

(56) References Cited

U.S. PATENT DOCUMENTS

| | | | |
|---|---|---|---|
| 7,689,210 B1* | 3/2010 | Bims | H04L 41/0806 455/422.1 |
| 10,638,417 B1* | 4/2020 | Baki | H04W 48/16 |
| 10,856,155 B2* | 12/2020 | Scahill | H04W 16/20 |
| 2006/0279774 A1* | 12/2006 | Matsuoka | H04L 12/2809 358/1.15 |
| 2011/0158127 A1* | 6/2011 | Duo | H04W 48/16 370/254 |
| 2011/0274029 A1* | 11/2011 | Connelly | H04W 12/50 370/315 |

(Continued)

*Primary Examiner* — Michael J Moore, Jr.
(74) *Attorney, Agent, or Firm* — Wenderoth, Lind & Ponack, L.L.P.

(57) ABSTRACT

Automatic configuration of network devices improves the control, management and configuration of a network environment. However, a network environment can include management software running on an access point device that is not compatible with or recognized by all network devices. The access point device using a network management software can obtain one or more configuration parameters associated with a network device that is not compatible, for example, uses a different protocol, and can send these configuration parameters to a network resource to obtain one or more configuration values necessary to configure a network device. The network resource, whether local to or remote from the access point device, can provide the one or more configuration values to the access point device as any type of data including a webform. The one or more configuration values allow the access point device to automatically configure any network devices.

20 Claims, 5 Drawing Sheets

(56) References Cited

U.S. PATENT DOCUMENTS

| | | | |
|---|---|---|---|
| 2014/0233425 A1* | 8/2014 | Cherian | H04W 12/50 |
| | | | 370/254 |
| 2014/0359477 A1* | 12/2014 | Chen | H04L 67/1078 |
| | | | 715/748 |
| 2016/0134469 A1* | 5/2016 | Carter | H04W 76/14 |
| | | | 370/254 |
| 2019/0028962 A1* | 1/2019 | Chun | H04W 48/02 |
| 2019/0373464 A1* | 12/2019 | Chari | H04L 63/083 |
| 2019/0373675 A1* | 12/2019 | Chari | H04W 16/20 |
| 2020/0204974 A1* | 6/2020 | Strater | H04B 17/318 |
| 2020/0274760 A1* | 8/2020 | Biedermann | H04L 41/0886 |
| 2022/0053404 A1* | 2/2022 | Panje | H04W 12/069 |
| 2022/0069892 A1* | 3/2022 | Strater | H04L 45/122 |
| 2022/0078635 A1* | 3/2022 | Panje | G06F 40/174 |
| 2022/0217603 A1* | 7/2022 | Chen | H04W 36/0016 |
| 2022/0294694 A1* | 9/2022 | Panje | H04L 41/0823 |
| 2024/0114368 A1* | 4/2024 | Panje | H04W 24/08 |
| 2024/0114447 A1* | 4/2024 | Panje | H04W 24/02 |
| 2024/0129187 A1* | 4/2024 | Panje | H04L 41/5019 |

* cited by examiner

WI-FI MULTIPLE ACCESS POINT—THIRD PARTY EXTENDER CONFIGURATION

BACKGROUND

Companies are increasingly providing Multiple Access Point (MAP) architecture or Home Network Controller (HNC) type of home wireless fidelity (Wi-Fi) management, with multiple access point devices and/or extender access point devices (collectively, network devices) within the home to improve Quality of Experience (QoE) of the user by offering extended coverage with seamless roaming. Access point devices and extender access point devices communicate with client devices using one or more RF channels. Typically, 5 GigaHertz (GHz) radio is used for Wi-Fi backhaul in extender access point devices because such offers more bandwidth with less interference and greater reliability when compared to 2.4 GHz radio.

Configuration of various network devices is increasingly being performed by users without assistance from a professional. New guidelines even discourage the requirement of professionals for setting up home network access point devices and/or extender access point devices. This move towards a user-only configuration and/or set-up introduces new challenges for associating network devices to, for example, a home network access point device.

Many customers often experience a problem with an existing gateway or access point device attempting to configure new or updated network devices within a network. In some cases, the access point device and the network devices, such as extender access point devices or client devices, distributed throughout the network environment are provided by different suppliers such that the access point device does not recognize the third-party network device. Because of such differing network devices within the network environment, controlling and configuring the various network devices can be a challenge that can require intensive manual intervention. For example, an access point device by one supplier can be required to control and configure an extender access point device by a third-party or that is running legacy software or even a new version of software. The access point device may not have the capability to automatically or dynamically interface with such third-party, legacy or new network devices.

Generally, to resolve the above-described problem, a system administrator or user must intervene to perform a manual configuration. Therefore, there is a need to provide control, configuration and maintenance of various network devices independent of the wireless fidelity (Wi-Fi) management stack or software on the access point device and the supplier of the network devices.

SUMMARY

Previously, a user would have to run two separate networks in the network environment: one network aware of the network management protocol or compatible with the management software of the access point device and one non-aware/incompatible based network. Issues would arise when any non-compliant or incompatible network devices, legacy network devices, network devices with upgraded or new software, any other third-party or non-automatically configurable network device were added or coupled to a network environment as such network devices did not recognize the network management protocol of the access point device. According to aspects of the present disclosure there are provided novel solutions for controlling, configuring and maintaining various network devices when such network devices are not by default manageable by the access point device software of the network environment. These novel solutions allow for automatic or dynamic configuration of various network devices, such as extender access point devices and/or client devices, by using information or data stored and updateable at a network resource which improves the QoE and decreases costs associated with the controlling, configuring and maintaining the various network devices as manual intervention is not required.

An aspect of the present disclosure provides an access point device for configuring a network device. The access point device comprises a memory storing one or more computer-readable instructions and a processor configured to execute the one or more computer-readable instructions to discover the network device, wherein the network device is not compatible with the access point device, receive one or more configuration parameters associated with the network device, send the one or more configuration parameters to a network resource, receive, from the network resource, one or more configuration values associated with the one or more configuration parameters, and configure the network device based, at least in part, on the one or more configuration values.

In an aspect of the present disclosure, the processor is further configured to execute the one or more instructions to verify the one or more configuration values.

In an aspect of the present disclosure, the processor is further configured to execute the one or more instructions to access a uniform resource locator (URL) based, at least in part, on the one or more configuration parameters to obtain the one or more configuration values.

In an aspect of the present disclosure, discovering the network device comprises utilizing any of a universal plug and play (UPnP) simple service discovery protocol (SSDP), an ethernet port connection, information associated with the network device received from a user, or a combination thereof.

In an aspect of the present disclosure, receiving, from the network resource, the one or more configuration values comprises receiving any of an auto-filled webform, a default-filled webform, a user-inputted webform, or a combination thereof.

In an aspect of the present disclosure, the auto-filled webform, the default-filled webform, the user-inputted webform, or any combination thereof is stored in a repository accessible by the network resource.

In an aspect of the present disclosure, the processor is further configured to execute the one or more instructions to update one or more values of a webform associated with the network device.

An aspect of the present disclosure provides a method for an access point device to of a network to configure a network device discoverable on the network. The method comprises discovering the network device, wherein the network device is not compatible with the access point device, receiving one or more configuration parameters associated with the network device, sending the one or more configuration parameters to a network resource, receiving, from the network resource, one or more configuration values associated with the one or more configuration parameters, and configuring the network device based, at least in part, on the one or more configuration values.

In an aspect of the present disclosure, the method further comprises verifying the one or more configuration values.

In an aspect of the present disclosure, the method further comprises accessing a uniform resource locator (URL)

based, at least in part, on the one or more configuration parameters to obtain the one or more configuration values.

In an aspect of the present disclosure, the method further comprises discovering the network device comprises utilizing any of a universal plug and play (UPnP) simple service discovery protocol (SSDP), an ethernet port connection, information associated with the network device received from a user, or a combination thereof.

In an aspect of the present disclosure, the method further comprises receiving, from the network resource, the one or more configuration values comprises receiving any of an auto-filled webform, a default-filled webform, a user-inputted webform, or a combination thereof.

In an aspect of the present disclosure, the method further comprises the auto-filled webform, the default-filled webform, the user-inputted webform, or any combination thereof is stored in a repository accessible by the network resource.

In an aspect of the present disclosure, the method further comprises updating one or more values of a webform associated with the network device.

An aspect of the present disclosure provides a non-transitory computer-readable medium of an access point device storing a program for configuring network device discoverable on a network. The program when executed by a processor of the access point device, causes the access point device to perform one or more operations including the steps of the methods described above.

The above-described network device(s) or electronic apparatus(es), such as access point devices, extender access point devices, client devices and any other network devices, may be implemented as any of a residential network access point device, an electronic device (for example, a mobile phone, a computing device such as a notebook computer, or both) according to some example embodiments.

Thus, according to various aspects of the present disclosure described herein, it is possible to automatically configure any network device coupled to the network in a network environment without requiring manual intervention. The novel solution(s) provide a network resource that contains information that can be used by an access point device to configure other network devices, such as extender access point devices or client devices, that are not compliant or are incompatible with the network management software or protocol of the access point device including, but not limited to, any of a legacy network device, a new network device, a network device running new or updated software, a third-party network device, or combinations thereof, In particular, the novel solution(s) provides improvements for automatically controlling, configuring and maintaining various network devices within a network environment. The novel solution(s) provide the ability to configure various network devices independent of the network management software or protocol of the access point device which is advantageous as such allows for the interoperability of various network devices without requiring user intervention and/or downtime. Additionally, the novel solution(s) provide the advantage of updating configuration values or information associated with the various network devices in a network repository where the updating can be by the network access device, a network repository or a cloud repository, a third-party supplier, and/or any other source.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
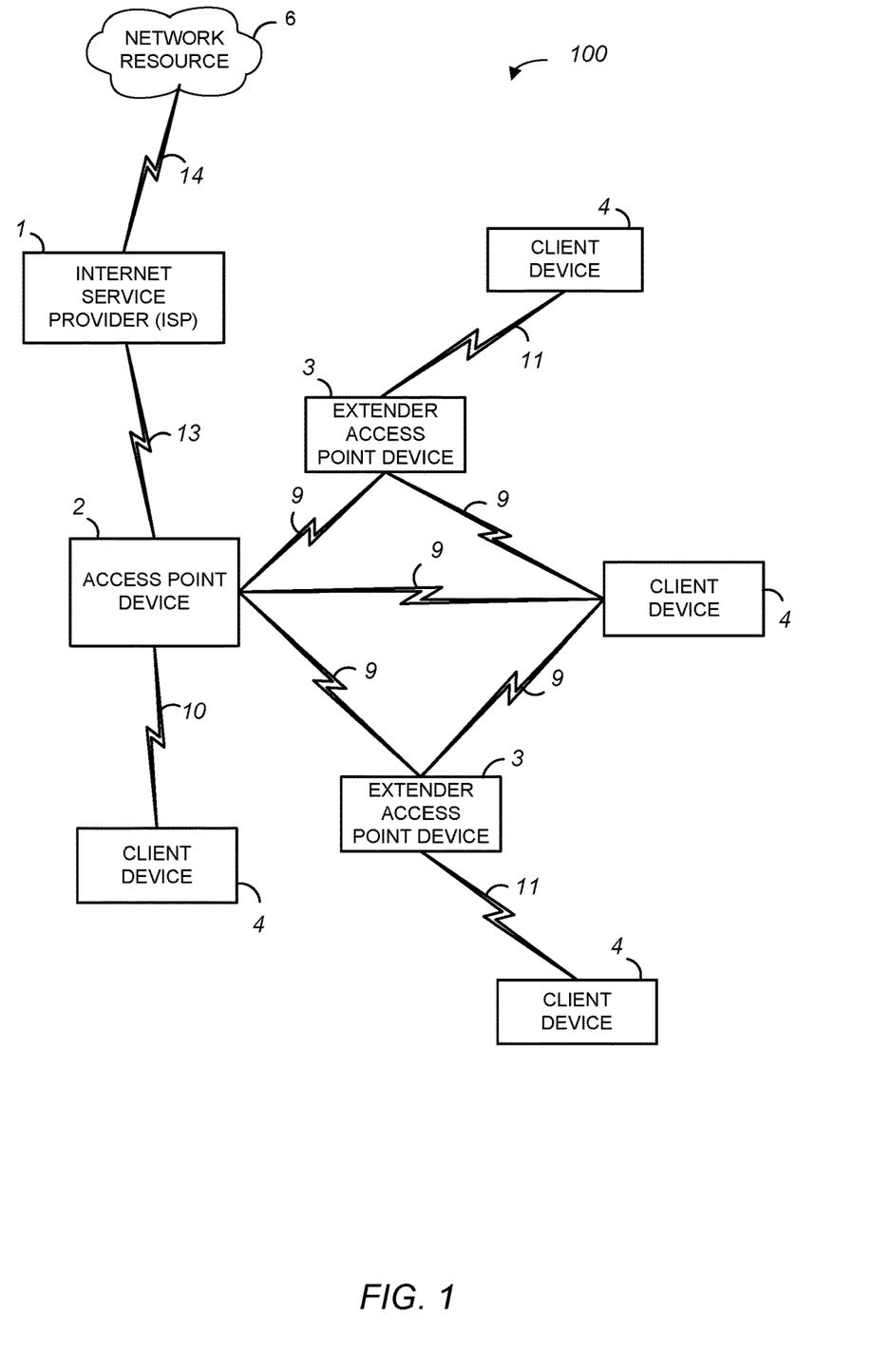
FIG. 1 is a schematic diagram of a network environment, according to one or more aspects of the present disclosure.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or multiple of some of the aforementioned electronic apparatuses in the network environment, which may itself consist of multiple communication networks and various known or future developed wireless connectivity technologies, protocols, devices, and the like.

As shown in FIG. 1, the main elements of the network environment 100 include a network comprising an access point device 2 connected to a network resource 6, such as a cloud-based repository, via an Internet Service Provider (ISP) 1 and also connected to different wireless devices or network devices such as one or more wireless extender access point devices 3 and one or more client devices 4. The network environment 100 shown in FIG. 1 includes wireless network devices (e.g., extender access point devices 3 and client devices 4) that may be connected in one or more wireless networks (e.g., private, guest, iControl, backhaul network, or Internet of things (IoT) network) within the network environment 100. Additionally, there could be some overlap between wireless devices (e.g., extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

Starting from the top of FIG. 1, the ISP 1 can be, for example, a content provider or any computer for connecting the access point device 2 to the network resource 6. For example, network resource 6 can be a cloud-based service that provides access to a cloud-based repository accessible via ISP 1 where the cloud-based repository comprises information associated with any one or more network devices of the network environment 100. The connection 14 between the network resource 6 and the ISP 1 and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example The access point device 2 can be, for example, an access point and/or a hardware electronic device that may be a combination modem and gateway that combines the functions of a modem, an access point (AP), and/or a router for providing content received from the ISP 1 to one or more network devices (e.g., wireless extender access point devices 3 and client devices 4) in the network environment 100. It is also contemplated by the present disclosure that the access point device 2 can include the function of, but is not limited to, a universal plug and play (UPnP) simple network management protocol (SNMP), an Internet Protocol/ Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2, the wireless extender access point devices 3, and client devices 4 can be implemented using a wireless connection in accordance with any IEEE 802.11 Wi-Fi protocols, Bluetooth protocols, BLE, or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels that are available for use. In one or more embodiments, one or more network devices (such as any of the one or more extender access point devices 3, the one or more client devices 4, or a combination thereof) are not compatible with network management software of the access point device 2, for example, the network device(s) use a protocol different than the protocol associated with the access point device 2.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4.

The connection 11 between the extender access point devices 3 and the client devices 4 are implemented through a wireless connection that operates in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection. Any one or more connections 11 can carry information on any one or more channels that are available for use.

The client devices 4 can be, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2. Further, a client device 4 can be a network device that requires configuration by the access point device 2.

The connection 10 between the access point device 2 and the client device 4 is implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. One or more of the connections 10 can also be a wired Ethernet connection. In one or more embodiments, any one or more client devices 4 utilize a protocol different than that of the access point device 2.

Figure 2:
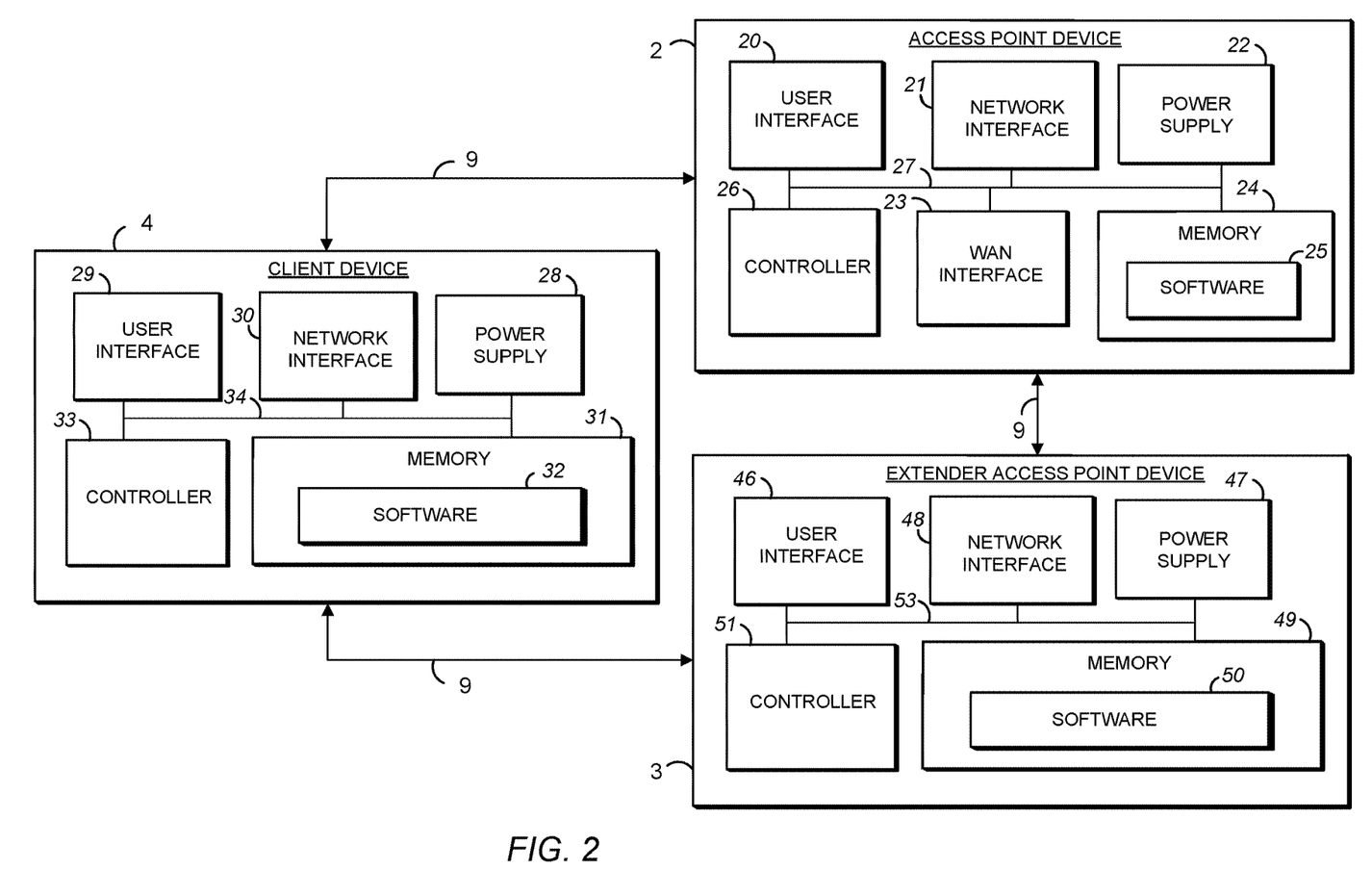
FIG. 2 is a more detailed block diagram illustrating various components of an exemplary access point device, client device, and extender access point device implemented in the network environment of FIG. 1, according to one or more aspects of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices or network devices over the one or more network connections to local and wide area networks, wireless and wired networks, public and private networks, and any other communication network enabling communication in the network environment 100.

FIG. 2 is a more detailed block diagram illustrating various components of an exemplary access point device, client device, and wireless extender implemented in the network environment 100 of FIG. 1, according to one or more aspects of the present disclosure.

Although FIG. 2 only shows one extender access point device 3 and one client device 4, the extender access point device 3 and the client device 4 shown in the figure are meant to be representative of the other extender access point devices 3 and client devices 4 of a network system, for example, network environment 100 shown in FIG. 1. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

Now referring to FIG. 2 (e.g., from left to right), the client device 4 can be, for example, a computer, a portable device, an electronic tablet, an e-reader, a PDA, a mobile phone such as a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. Additionally, the client device 4 can be a TV, an IP/QAM STB, or an SMD that is capable of decoding audio/video content, and playing over OTT or MSO provided content received through the access point device 2.

As shown in FIG. 2, the client device 4 includes a power supply 28, a user interface 29, a network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4, for example, for a user to enter any one or more configuration parameters that are stored in memory 31. The network interface 30 can include, but is not limited to, various network cards, interfaces, and circuitry implemented in software and/or hardware to enable communications with the access point device 2 and the extender access point device 3 using any one or more of the communication protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, memory 31 can store any one or more configuration parameters associated with a client device 4 that allow the access point device 2 to control, configure and/or maintain a network connection with the client device 2. For example, the one or more configuration parameters can include any of a unique identifier, an IP address, a make value, a model value, a username, a password, a webform, a universal resource locator (URL), a service set identifier (SSID), a channel number, or any combination thereof associated with the client device 4. In one or more embodiments, client device 4 is a network device, such as a mobile phone, and software 32 includes one or more instructions for establishing a connection with the access point device 2 and/or an extender access point device 3.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to any one or more client devices 4, which may be out of range of the access point device 2 including, but not limited to, a wireless extender, a repeater, and/or an AP. The extender access point device 3 can also receive signals from any one or more of the client devices 4 and rebroadcast the signals to the access point device 2, mobile device 5, or any other one or more client devices 4.

As shown in FIG. 2, the extender access point device 3 includes a user interface 46, a power supply 47, a network interface 48, a memory 49, and a controller 51.

The user interface 46 can include, but is not limited to, push buttons, a keyboard, a keypad, an LCD, a TFT, an LED, an HD or other similar display device including a display device having touch screen capabilities so as to allow interaction between a user and the extender access point device 3, for example, for a user to enter any one or more configuration parameters that are stored in memory 49.

The power supply 47 supplies power to the internal components of the wireless extender access point device 3 through the internal bus 53. The power supply 47 can be connected to an electrical outlet (e.g., either directly or indirectly by way of another device) via a cable or wire.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul connection between the extender access point device 3 and one or more client device(s) 4. In one or more embodiments, any one or more extender access point devices 3 utilize a protocol different than that of the access point device 2.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure. In one or more embodiments, memory 49 can store any one or more configuration parameters associated with an extender access point device 3 that allow the access point device 2 to control, configure and/or maintain a network connection with the client device 2. For example, the one or more configuration parameters can include any of a unique identifier, an IP address, a make value, a model value, a username, a password, a webform, a universal resource locator (URL), an SSID, a channel number, or any combination thereof associated with the expander access point device 3. In one or more embodiments, extender access point device 3 is a network device and software 50 includes one or more instructions for establishing a connection with the access point device 2 and/or a client device 4.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a digital signal processor (DSP), or other similar processing device capable of executing any type of instructions, algorithms, or software for controlling the operation and functions of the wireless extender access point device 3 in accordance with the embodiments described in the present disclosure. General communication between the components (e.g., 46-51) of the extender access point device 3 may be established using the internal bus 53.

The access point device 2 can be, for example, a hardware electronic device that can combine one or more functions of any of a modem, a gateway, an access point (AP), a router, or combinations thereof for providing content received from the content provider (ISP) 1 to network or wireless devices (e.g., extender access point devices 3, client devices 4) in the system. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26.

The user interface 20 can include, but is not limited to, push buttons, a keyboard, a keypad, an LCD, a TFT, an LED, an HD or other similar display device including a display device having touch screen capabilities so as to allow interaction between a user and the access point device 2. In one or more embodiments, the user interface 20 provides an interface, such as a command-line interface, a graphical user interface, an interface output port for connection to a display, and/or an other type of user interface, that allows a user to manually enter one or more configuration parameters associated with any one or more network devices including, but not limited to, a client device 4 and/or an extender access point device 3. In one or more embodiments, the one or more configuration parameters can be stored in or at a network resource, for example, as discussed with respect to FIGS. 3-5.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul connection between the access point device 2 and the wireless extender access point device(s) 3. Another radio or set of radios (e.g., 2.4 GHz, 5 GHz, and/or 6 GHz radio(s)) provides a fronthaul connection between the access point device 2 and one or more client device(s) 4. In one or more embodiments, the network interface 21 interfaces with a network resource local to and/or remote from the access point device 2 as discussed with reference to FIGS. 3-5.

The power supply 22 supplies power to the internal components of the access point device 2 through the internal bus 27. The power supply 22 can be connected to an electrical outlet (e.g., either directly or by way of another device) via a cable or wire.

The wide area network (WAN) interface 23 may include various network cards, and circuitry implemented in software and/or hardware to enable communications between the access point device 2 and the ISP 1 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the access point device 2 and performing management functions related to the other devices (wireless extender access point devices 3 and client devices 4) in the network in accordance with the embodiments described in the present disclosure (e.g., including a network management that includes configuring one or more network devices). In one or more embodiments, the network management functions comprise configuring a network device, for example, a client device 4, an extender device 3 or both as discussed with reference to FIGS. 3-5. In one or more embodiments, the management functions comprise interface with a network resource as discussed with reference to FIGS. 3-5. The memory 24 can also include a network resource as discussed with reference to FIGS. 3-5.

The controller 26 controls the general operations of the access point device 2 as well as performs management functions related to the other network devices (wireless extender access point devices 3 and client device 4) in the network including configuring one or more network devices. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure. Communication between the components (e.g., 20-24, and 26) of the access point device 2 may be established using the internal bus 27. The controller 26 may also be referred to as a processor, generally.

Figure 3:
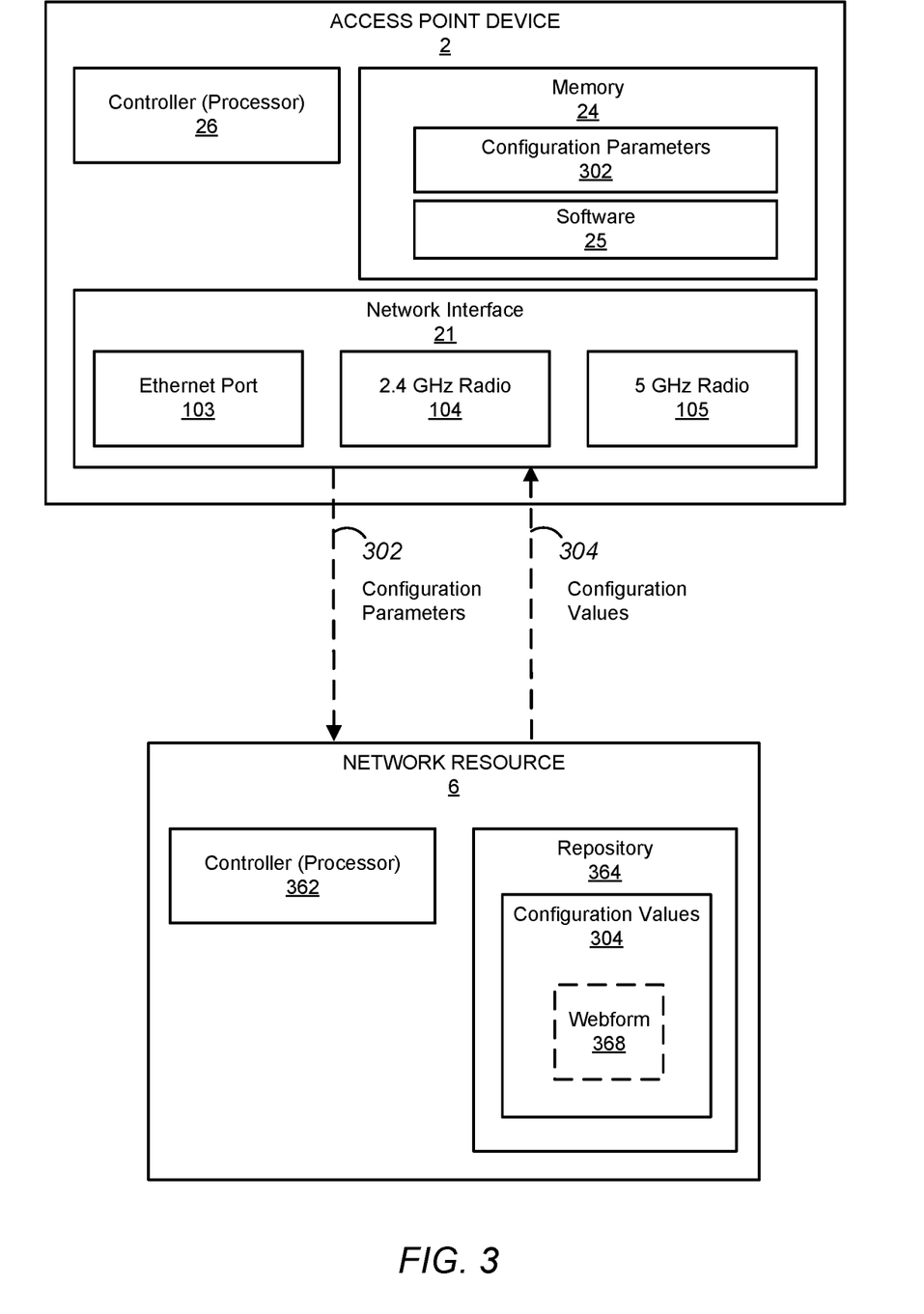
FIG. 3 is a more detailed block diagram illustrating certain components of an exemplary access point device implemented in the network environment of FIGS. 1-2, according to one or more aspects of the present disclosure.

FIG. 3 is a more detailed block diagram illustrating certain components of an exemplary access point device implemented in the network environment of FIG. 1 and in FIG. 2, according to some example embodiments.

As shown in FIG. 3, the access point device 2 includes the network interface 21, the memory 24, and the controller (processor) 26.

The network interface 21 includes an Ethernet port 103 (e.g., a wired LAN interface), a 2.4 GHz radio 104 and a 5 GHz radio 105 (e.g., wireless LAN interfaces, or WLAN interfaces). The access point device 2 may communicate with the local area network devices (e.g., one or more extender access point devices 3, one or more client devices 4, and/or any other network device) of a network, for example, network environment 100 of FIG. 1, via one or more of the Ethernet port 103, the 2.4 GHz radio 104, and/or the 5 GHz radio 105. However, some other example embodiments of inventive concepts of the present disclosure are not limited to these interfaces only (e.g., the techniques may be applied with a 6 GHz radio or other similar future developed technologies). As mentioned above, according to aspects of the present disclosure, one radio or set of radios can operate as a backhaul radio to provide a backhaul connection between the access point device 2 and the wireless extender access point device(s) 3, while another radio or set of radios can provide a fronthaul connection between the access point device 2 and the client device(s) 4.

The memory 24 includes a software 25 that performs one or more management functions, for example, configuration of one or more network devices coupled to the access point device 2 of a network. The software 25 may be implemented as part of the instructions, algorithms, or software described above with reference to FIG. 2. The memory 24 can also store one or more configuration parameters received from any one or more network devices such as one or more extender access point devices 3, one or more client devices 4, or a combination thereof.

The controller 26 includes a processor that is configured to access the memory 24, perform the one or more management functions (e.g., via execution of the software 25). The processor of the controller 26 also controls communications with the network or wireless devices (e.g., the wireless extender access point devices 3, the client devices 4) via the Ethernet port 103, the 2.4 GHz radio 104, and/or the 5 GHz radio 105 in accordance with embodiments described in the present disclosure.

In one or more embodiments, the network interface 21 interfaces with a network resource 6 that is remote from the access point device 2. For example, the access point device 21 can transmit one or more configuration 302 to and/or receive one or more configuration values 304 from the network resource 6 via a network connection such as connection 13 to ISP 1 and connection 14 to network resource 6 as discussed with reference to FIG. 1.

For example, the network resource 6 can comprise a computing device (e.g., a server, a computer, an electronic device, and/or any other network device), a website, a repository or library such as a database, data structure, or a flat-file system, a web page, a backend processing system, a cloud-based resource, any other resource that can store and communicate information, or any combination thereof. Network resource 6 can comprise a controller 362 (e.g. a processor or CPU) that executes one or more computer-readable instructions to query a repository 364, update information in repository 364, store information in repository 364 and/or any other repository management, configuration or interface function or operation.

In one or more embodiments, repository 364 stores one or more configuration values 304 associated with the one or more configuration parameters 302 that are associated with any one or more network devices (e.g., an extended access point device 3, a client device 4, or both) in a memory such as a database, a flat-file system, a data structure, and/or any other type of storage system or medium. The network resource 6 can receive the one or more configuration parameters 302 from an access point device 2, for example, via network interface 21. In response, the network resource 6 can send or transmit the one or more configuration values 304 associated with the one or more configuration parameters 302 to the access point device 2, where, for example, the access point device 2 receives the one or more configuration values 304 via a network interface 21.

In one or more embodiments, the repository 364 stores the one or more configuration values 304 associated with any one or more network devices as a webform 368. The webform 368 can be an auto-filled or pre-filled webform, a default-filled webform, a user-entered or user-formatted webform, any other type of webform, or a combination thereof.

The auto-filled or pre-filled webform can be a webform 368 that is populated by the network resource 6 based on the one or more configuration parameters 302, a user, a third-party software program, an API of the network resource, or any other network resource or service. For example, the network resource 6 can include one or more APIs that allow a third-party website or URL to send or communicate the information (e.g., the one or more configuration values 304) required by a webform 368 and/or the network resource 6 can interface with an API of a third-party to obtain the one or more configuration values 304 required by a webform 368. In one or more embodiments, the APIs of any one or more third parties can be standardized such that the network resource 6 can interface with any third-party API to obtain the one or more configuration values 304. In one or more embodiments, the network resource 6 proactively requests or fetches information to update and/or create one or more webforms 368.

A default-filled webform can be a webform 368 that contains default configuration values and can be generated or created, for example, when a webform 368 associated with the one or more configuration parameters 302 is not available or does not exist. For example, the network resource 6 can store in repository 364 one or more default-filled webforms that include one or more configuration values 304 based, at least in part, on one or more generic configuration parameters. These one or more generic configuration parameters can be input by a user and/or obtained as discussed above with reference to the auto-filled or pre-filled webform. The one or more generic configuration parameters can be values that are typical and/or generally used for the configuration of a network device.

A user entered webform can be a webform 368 that includes one or more configuration values 304 received from a user. For example, the user can obtain the one or more configuration values 304 using help information via a portal of the access point device 2 to a network device and/or from a website or URL associated with the network device, a manual, a specification or other material or resource associated with the network device, or a combination thereof. The user can input or enter one or more configuration values 304 via a user interface of the access point device 2 and/or the network resource 6, via a user interface of a website or URL associated with the access point device 2 and/or the network resource 6, via an API associated with the access point device 2 and/or the network resource 6, or any combination thereof.

In one or more embodiments, any of the webforms 368 can be stored in a repository 364 as illustrated in FIG. 3. Any one or more webforms 368 can be updated or edited by a user, via an API associated with the webform 368, by fetching information from a URL associated with the network device, or any combination thereof. In one or more embodiments, after receiving the one or more configuration parameters 302, the network resource 6 fetches the webform 368 from a URL based on at least one of the one or more configuration parameters 302. The network resource 6 can fetch the webform 368 in real-time and/or on-demand.

In one or more embodiments, the webform 368 and/or the one or more configuration values 304 can be automatically or periodically fetched, updated or created. In one or more embodiments, a machine learning or artificial intelligence tool can be utilized to fetch, update or create any one or more configuration values 304 or webform 368. In one or more embodiments, a network resource 6 can pre-populate the repository 364 with one or more configuration values 304 associated with one or more configuration parameters 302 and/or network devices. In one or more embodiments, a webform 368 can be standardized such that any third-party can update and/or create a webform 368.

Figure 4:
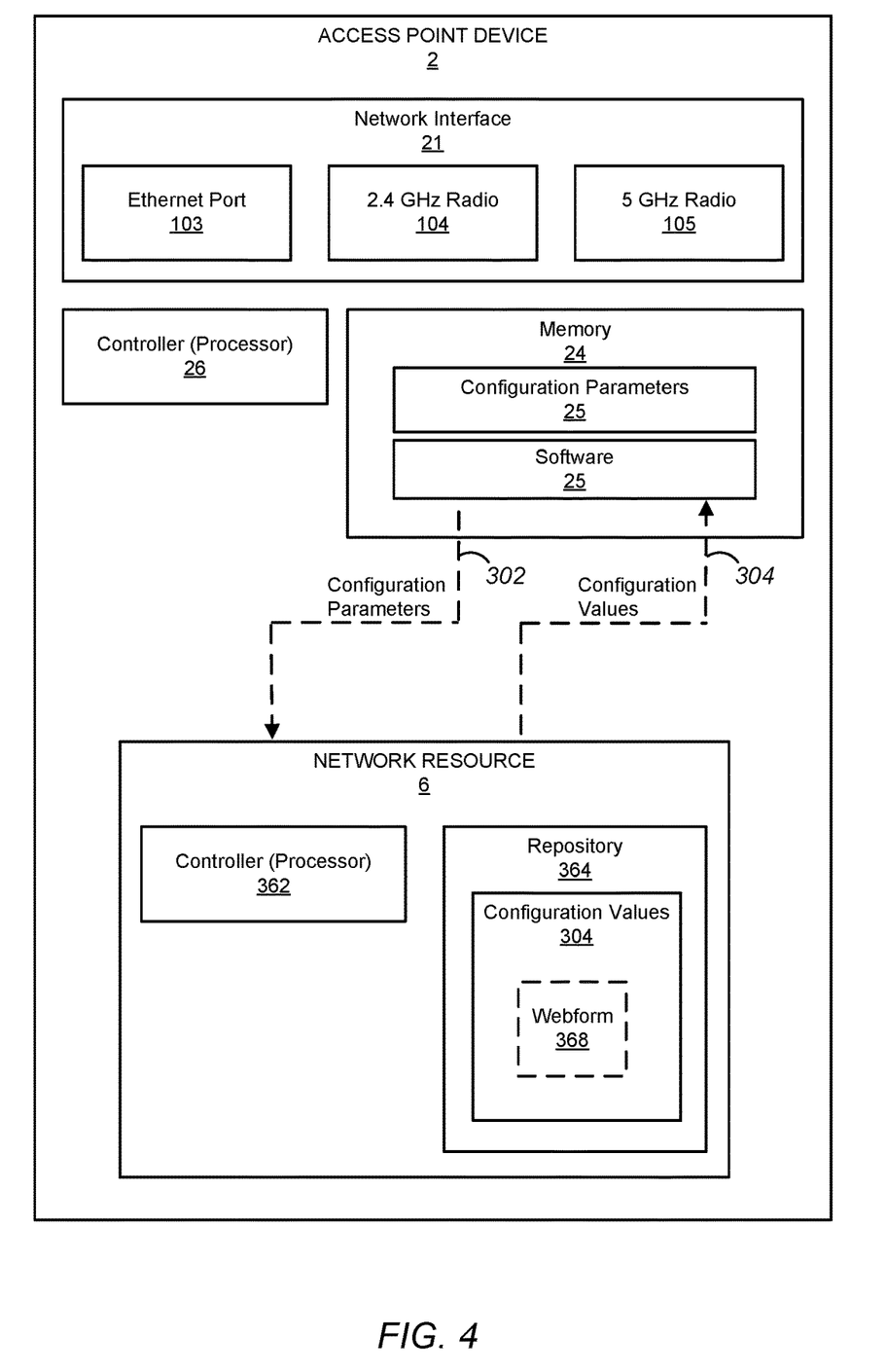
FIG. 4 is a more detailed block diagram illustrating certain components of an exemplary access point device implemented in the network environment of FIGS. 1-3, according to one or more aspects of the present disclosure.

FIG. 4 is a more detailed block diagram illustrating certain components of an exemplary access point device 2 implemented in the network environment of FIGS. 1-2, according to an embodiment of the present disclosure. The access point device 2 and network resource 6 of FIG. 3 is similar to FIG. 4, except the network resource 6 of FIG. 4 is local to or included within the access point device 2 such that the software 25 accesses the network resource 6 via one or more internal connections, for example, internal bus 27.

Problems can occur during installation and/or configuration of one or more network or wireless network devices in a network environment, for example, network environment 100 of FIG. 2. For example, an extender access point device 3 or a client device 4 may not support the protocol of the access point device 2 or may not be compatible with network management software utilized by access point device 2 to configure any one or more network devices. The novel solution(s) provided allow an access point device 2 to configure any one or more network devices independent of supplier, manufacturer, version, make/model, protocol, software version, and/or any other configuration parameter associated with the network device and/or the access point device 2.

Figure 5:
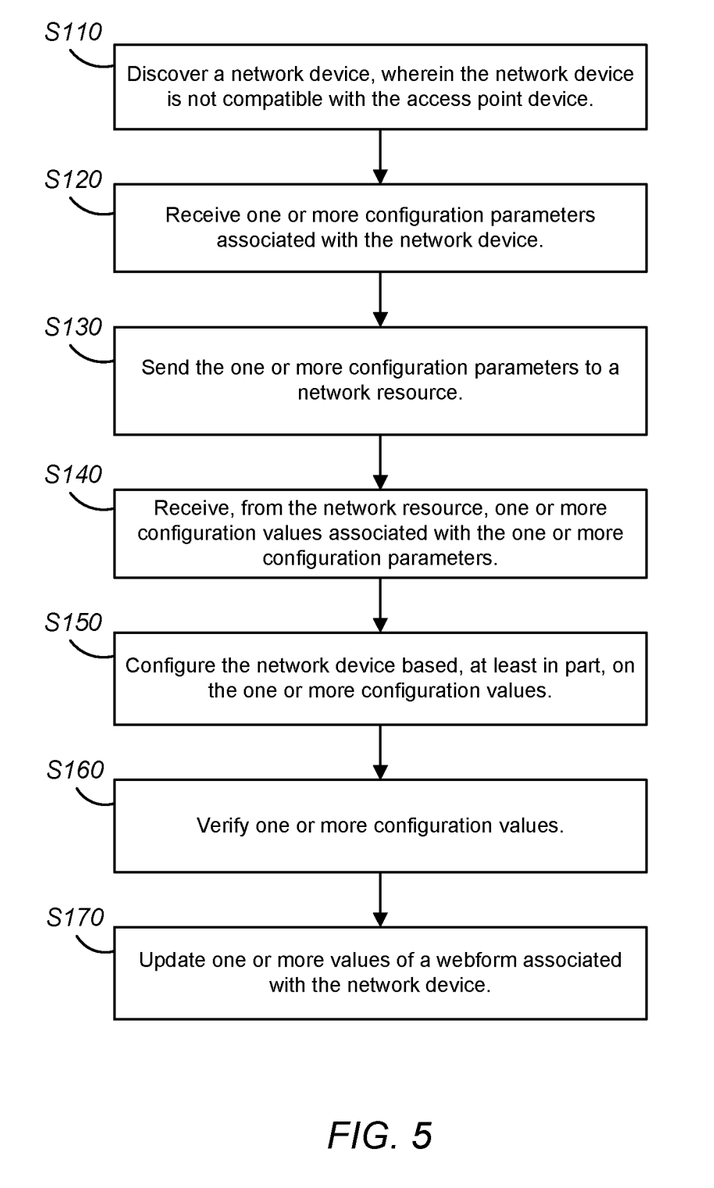
FIG. 5 is a flow chart illustrating a method for dynamic channel selection, according to one or more aspects of the present disclosure.

FIG. 5 is a flow chart illustrating a method for configuration of one or more network devices, according to one or more aspects of the present disclosure.

The access point device 2 may be programmed with one or more instructions (e.g., HNC controller instructions) such as a network management software or application that when executed by a processor or controller causes the access point device 2 to configure one or more network devices in some example embodiments. In FIG. 5, it is assumed that any one or more of the devices include their respective controllers and their respective software stored in their respective memories, as discussed above in connection with FIGS. 1-4, which when executed by their respective controllers perform the functions and operations in accordance with the example embodiments of the present disclosure (e.g., including performing a configuration of one or more network devices).

The access point device 2 comprises a controller 26 that executes one or more computer-readable instructions, stored on a memory 24, that when executed perform one or more of the operations of steps S110-S170. In one or more embodiments, the one or more instructions can be one or more software applications, for example, one or more software 25. While the steps S110-S170 are presented in a certain order, the present disclosure contemplates that any one or more steps can be performed simultaneously, substantially simultaneously, repeatedly, in any order or not at all (omitted).

At step S110, the access point device 2 discovers one or more network devices, for example, one or more extender access point devices 3 and/or one or more client devices 4. The access point device 2 can utilize any one or more discovery methods including, but not limited to, UPnP simple service discovery protocol (SSDP), discovery over an ethernet port connection, and/or via information from a user associated with a user interface of the access point device 2. For example, UPnP SSDP allows a network device to advertise to one or more other devices on the network or to listen passively. Using a UPnP SSDP discovery message, the access point device 2 can obtain one or more configuration parameters 302 associated with the network device from a URL included in the discovery message. In another example, the access point device 2 can be connected via an ethernet port to the network device to obtain the one or more configuration parameters 302. Additionally, a user interface of the access point device 2 can provide an interface that accepts or receives an inputs, for example, a user can manually enter the make, model and/or any other configuration information associated with the network device that is required by the access point device 2 to configure the network device. As an example, an information page associated with the network device supplier and/or version can be provided by the access point device 2 for a user to fill in one or more fields associated with one or more configuration parameters 302.

At step S120, the access point device receives one or more configuration parameters 302 associated with the network device. After a network device has been discovered, the access point device 2 can receive the one or more configuration parameters 302 via any one or more of the discovery methods discussed with reference to step S110. For example, the access point device 2 receives the one or more configuration parameters 302 associated with the network resource 6 from the network device itself, a URL associated with the network, one or more stored configuration parameters, and/or from one or more values received from a user input. In one or more embodiments, the network device as part of the discovery process can receive the one or more configuration parameters 302.

At step S130, the access point device 2 can send or transmit the one or more configuration parameters 302 to a network resource 6. In one or more embodiments, the network resource 6 is local to or remote from the access point device 2.

At step S140, the access point device 2 can receive from the network resource 6 one or more configuration values 304 associated with the one or more configuration parameters 302 that were discovered and/or received by the access point device 2. The one or more configuration values 304 can be obtained, fetched, posted, stored and/or retrieved as discussed with reference to FIGS. 3 and 4. For example, the one or more configuration values 304 can be retrieved from a repository 364 of a network resource 6, from a URL associated with the one or more configuration parameters, a webform, or any combination thereof. In one or more embodiments, the one or more configuration values 304 are retrieved from the repository 364 and/or sent to the access point device 2 as a webform 386.

At step S150, the access point device 2 configures the network device based, at least in part on the one or more configuration values 304. In one or more embodiments, the configuration values are updated periodically by any of the network resource 6, one or more third-party APIs, one or more network resource 6 APIs, a user, any one or more update services, one or more methods such as those discussed with reference to FIGS. 3-4, or any combination thereof.

At step S160, the one or more configuration values 304 are verified. In one or more embodiments, the access point device 2 can utilize a web browser to open a URL of a third-party associated with one or more network devices, provide the necessary credentials if any, and confirm that the one or more configuration values 304 are the most recent, recommended or updated values. In one or more embodiments, the configuration values 304 can be verified by the access point device 2 running one or more network tests using the one or more configuration values.

At step S170, the one or more values of a webform 368 associated with a network device are updated. For example, the one or more values of a webform 368 can be updated via a user interface as discussed with reference to FIGS. 2-4.

According to one or more example embodiments of inventive concepts disclosed herein, there are provided novel solutions for configuring one or more network devices automatically using one or more configuration values retrieved from a network resource where the one or more configuration values are associated with one or more configuration parameters associated with the network device. The novel solutions according to example embodiments of inventive concepts disclosed herein provide features that enhance the installation and configuration of home/residential network gateway (GW) devices, wireless fidelity access points (Wi-Fi APs), Home Network Controller (HNC) devices, wireless routers, mesh networking nodes (e.g., Wi-Fi EasyMesh systems), and the like by providing automatic and dynamic configuration of network devices based on configuration values that can be verified, updated and stored in a network resource, such as a webform stored in a repository.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What I claim is:

1. An access point device of a network for configuring a network device comprising:
    a memory storing one or more computer-readable instructions;
    a processor configured to execute the one or more computer-readable instructions to:
        discover the network device, wherein the network device is not compatible with the access point device;
        receive one or more configuration parameters associated with the network device;
        send the one or more configuration parameters to a network resource, wherein the access point device is connected to the network resource via an Internet service provider (ISP)
        in response to sending the one or more configuration parameters to the network resource, receive, from the network resource, one or more configuration values, stored at the network resource, associated with the one or more configuration parameters; and
        configure the network device based, at least in part, on the one or more configuration values.

2. The access point device of claim 1, wherein the processor is further configured to execute the one or more instructions to:
    verify the one or more configuration values by:
        utilizing a web browser to open a uniform resource locator (URL) of a third-party associated with the one or more network devices; and
        providing one or more credentials via the URL; and
        confirming that the one or more configuration values are most recent, recommended or updated.

3. The access point device of claim 1, wherein the processor is further configured to execute the one or more instructions to:
    access a uniform resource locator (URL) of a third party associated with the network device based, at least in part, on the one or more configuration parameters to obtain the one or more configuration values.

4. The access point device of claim 1, wherein discovering the network device comprises utilizing any of a universal plug and play (UPnP) simple service discovery protocol (SSDP), an ethernet port connection, information associated with the network device received from a user, or a combination thereof.

5. The access point device of claim 1, wherein receiving, from the network resource, the one or more configuration values comprises:
    receiving any of an auto-filled webform, a default-filled webform, a user-inputted webform, or a combination thereof stored at the network resource.

6. The access point device of claim 5, wherein the auto-filled webform, the default-filled webform, the user-inputted webform, or any combination thereof is stored in a repository accessible by the network resource.

7. The access point device of claim 1, wherein the processor is further configured to execute the one or more instructions to:
    update one or more values of a webform associated with the network device.

8. A method for an access point device of a network to configure a network device discoverable on the network, the method comprising:
    discovering the network device, wherein the network device is not compatible with the access point device;

receiving one or more configuration parameters associated with the network device;

sending the one or more configuration parameters to a network resource, wherein the access point device is connected to the network resource via an Internet service provider (ISP);

in response to sending the one or more configuration parameters to the network resource, receiving, from the network resource, one or more configuration values, stored at the network resource, associated with the one or more configuration parameters; and configuring the network device based, at least in part, on the one or more configuration values.

9. The method of claim 8, further comprising:
verifying the one or more configuration values by:
utilizing a web browser to open a uniform resource locator (URL) of a third-party associated with the one or more network devices; and
providing one or more credentials via the URL; and
confirming that the one or more configuration values are most recent, recommended or updated.

10. The method of claim 8, further comprising:
accessing a uniform resource locator (URL) of a third party associated with the network device based, at least in part, on the one or more configuration parameters to obtain the one or more configuration values.

11. The method of claim 8, wherein discovering the network device comprises utilizing any of a universal plug and play (UPnP) simple service discovery protocol (SSDP), an ethernet port connection, information associated with the network device received from a user, or a combination thereof.

12. The method of claim 8, wherein receiving, from the network resource, the one or more configuration values comprises:
receiving any of an auto-filled webform, a default-filled webform, a user-inputted webform, or a combination thereof stored at the network resource.

13. The method of claim 12, wherein the auto-filled webform, the default-filled webform, the user-inputted webform, or any combination thereof is stored in a repository accessible by the network resource.

14. The method of claim 8, further comprising:
updating one or more values of a webform associated with the network device.

15. A non-transitory computer-readable medium of an access point device storing a program for configuring network device discoverable on a network, which when executed by a processor of the access point device, cause the access point device to perform operations comprising:
discovering the network device, wherein the network device is not compatible with the access point device;

receiving one or more configuration parameters associated with the network device;

sending the one or more configuration parameters to a network resource, wherein the access point device is connected to the network resource via an Internet service provider (ISP);

in response to sending the one or more configuration parameters to the network resource, receiving, from the network resource, one or more configuration values, stored at the network resource, associated with the one or more configuration parameters; and configuring the network device based, at least in part, on the one or more configuration values.

16. The non-transitory computer-readable medium of claim 15, wherein the program, when further executed by the processor, causes the access point device to perform one or more further operations comprising:
verifying the one or more configuration values by:
utilizing a web browser to open a uniform resource locator (URL) of a third-party associated with the one or more network devices; and
providing one or more credentials via the URL; and
confirming that the one or more configuration values are most recent, recommended or updated.

17. The non-transitory computer-readable medium of claim 15, wherein the program, when further executed by the processor, causes the access point device to perform one or more further operations comprising:
accessing a uniform resource locator (URL) of a third party associated with the network device based, at least in part, on the one or more configuration parameters to obtain the one or more configuration values.

18. The non-transitory computer-readable medium of claim 15, wherein receiving, from the network resource, the one or more configuration values comprises:
receiving any of an auto-filled webform, a default-filled webform, a user-inputted webform, or a combination thereof stored at the network resource.

19. The non-transitory computer-readable medium of claim 18, wherein the auto-filled webform, the default-filled webform, the user-inputted webform, or any combination thereof is stored in a repository accessible by the network resource.

20. The non-transitory computer-readable medium of claim 15, wherein the program, when further executed by the processor, causes the access point device to perform one or more further operations comprising:
updating one or more values of a webform associated with the network device.

\* \* \* \* \*